United States Patent
McIntosh

(10) Patent No.: US 11,937,035 B2
(45) Date of Patent: Mar. 19, 2024

(54) SURVEILLANCE PENDANT ASSEMBLY

(71) Applicant: Gary McIntosh, Macon, GA (US)

(72) Inventor: Gary McIntosh, Macon, GA (US)

(*) Notice: Subject to any disclaimer, the term of this patent is extended or adjusted under 35 U.S.C. 154(b) by 390 days.

(21) Appl. No.: 17/203,969

(22) Filed: Mar. 17, 2021

(65) Prior Publication Data
US 2022/0303651 A1    Sep. 22, 2022

(51) Int. Cl.
| H04R 1/02 | (2006.01) |
| A44C 25/00 | (2006.01) |
| H04N 7/18 | (2006.01) |
| H04N 23/51 | (2023.01) |
| H04R 1/08 | (2006.01) |

(52) U.S. Cl.
CPC ............ H04R 1/028 (2013.01); A44C 25/001 (2013.01); H04N 7/185 (2013.01); H04N 23/51 (2023.01); H04R 1/083 (2013.01)

(58) Field of Classification Search
CPC ...... H04R 1/028; H04R 1/083; A44C 25/001; H04N 23/51; H04N 7/185
See application file for complete search history.

(56) References Cited

U.S. PATENT DOCUMENTS

| 8,593,570 B2 | 11/2013 | Boland |
| 9,398,790 B1 | 7/2016 | Ketcher |
| 9,819,850 B2 | 11/2017 | Taran Katz |
| 10,261,547 B1 | 4/2019 | DiMeglio |
| 2010/0077797 A1 | 4/2010 | Gordon |
| 2017/0064160 A1* | 3/2017 | Hales .................... H04N 1/2112 |
| 2021/0350823 A1* | 11/2021 | Wexler .................... G10L 15/07 |

FOREIGN PATENT DOCUMENTS

CN         207167992 U  *  4/2018

* cited by examiner

*Primary Examiner* — Minh Q Phan

(57) ABSTRACT

A surveillance pendant assembly for discretely recording audio and video includes a personal electronic device and a pendant that is attachable to a necklace for wearing on a user. A video camera is integrated into the pendant to capture video footage of the user's environment. A microphone is integrated into the pendant to record audio of the user's environment. Each of the video camera and the microphone are in remote communication with the personal electronic device for storing video and audio in the personal electronic device.

5 Claims, 4 Drawing Sheets

SURVEILLANCE PENDANT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to surveillance device and more particularly pertains to a new surveillance device for discretely recording audio and video. The device includes a video camera and a microphone that are each integrated into a pendant on a necklace. Additionally, each of the video camera and the microphone are in communication with a personal electronic device for storing video and audio that are recorded.

(2) Description of Related Art Including Information Disclosed Under 37 CFR 1.97 and 1.98

The prior art relates to surveillance devices including a variety of surveillance devices that include a microphone integrated into a pendant for recording audio. The prior art also discloses a smart device concealment that includes a pendant that can house a smart device. In no instance does the prior art disclose a pendant which houses a video camera and a microphone which are each in communication with a personal electronic device for storing video and audio.

BRIEF SUMMARY OF THE INVENTION

An embodiment of the disclosure meets the needs presented above by generally comprising a personal electronic device and a pendant that is attachable to a necklace for wearing on a user. A video camera is integrated into the pendant to capture video footage of the user's environment. A microphone is integrated into the pendant to record audio of the user's environment. Each of the video camera and the microphone are in remote communication with the personal electronic device for storing video and audio in the personal electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
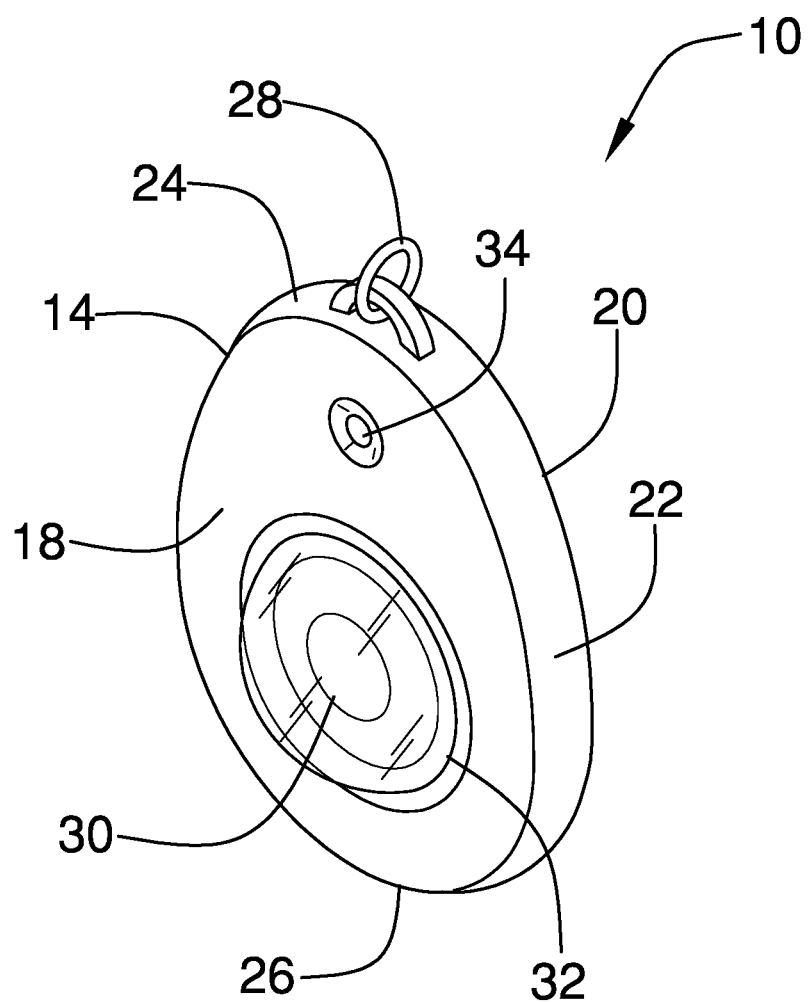
FIG. 1 is a front perspective view of a surveillance pendant assembly according to an embodiment of the disclosure.
Figure 2:
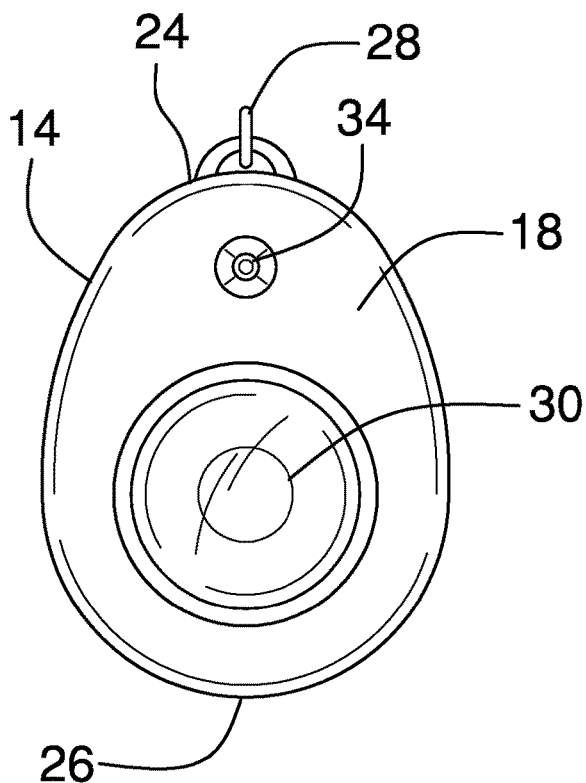
FIG. 2 is a front view of an embodiment of the disclosure.
Figure 3:
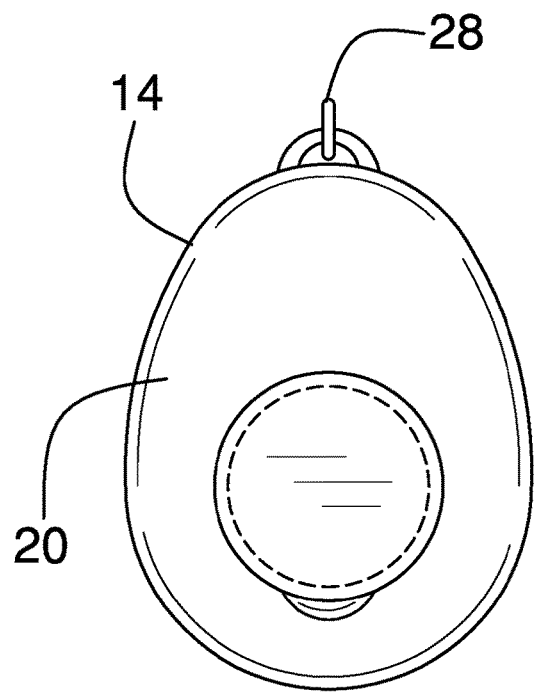
FIG. 3 is a back view of an embodiment of the disclosure.
Figure 4:
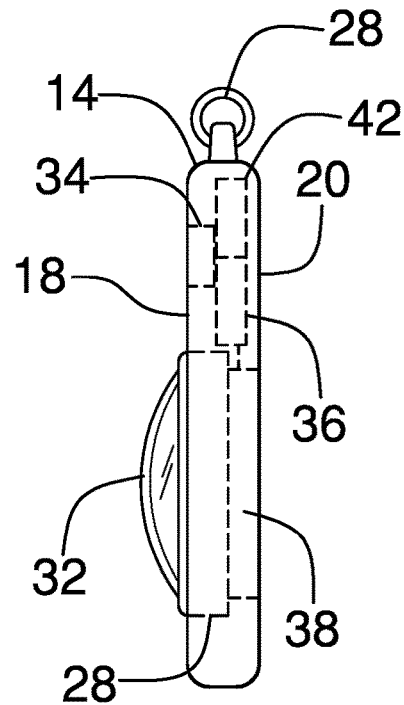
FIG. 4 is a left side phantom view of an embodiment of the disclosure.
Figure 5:
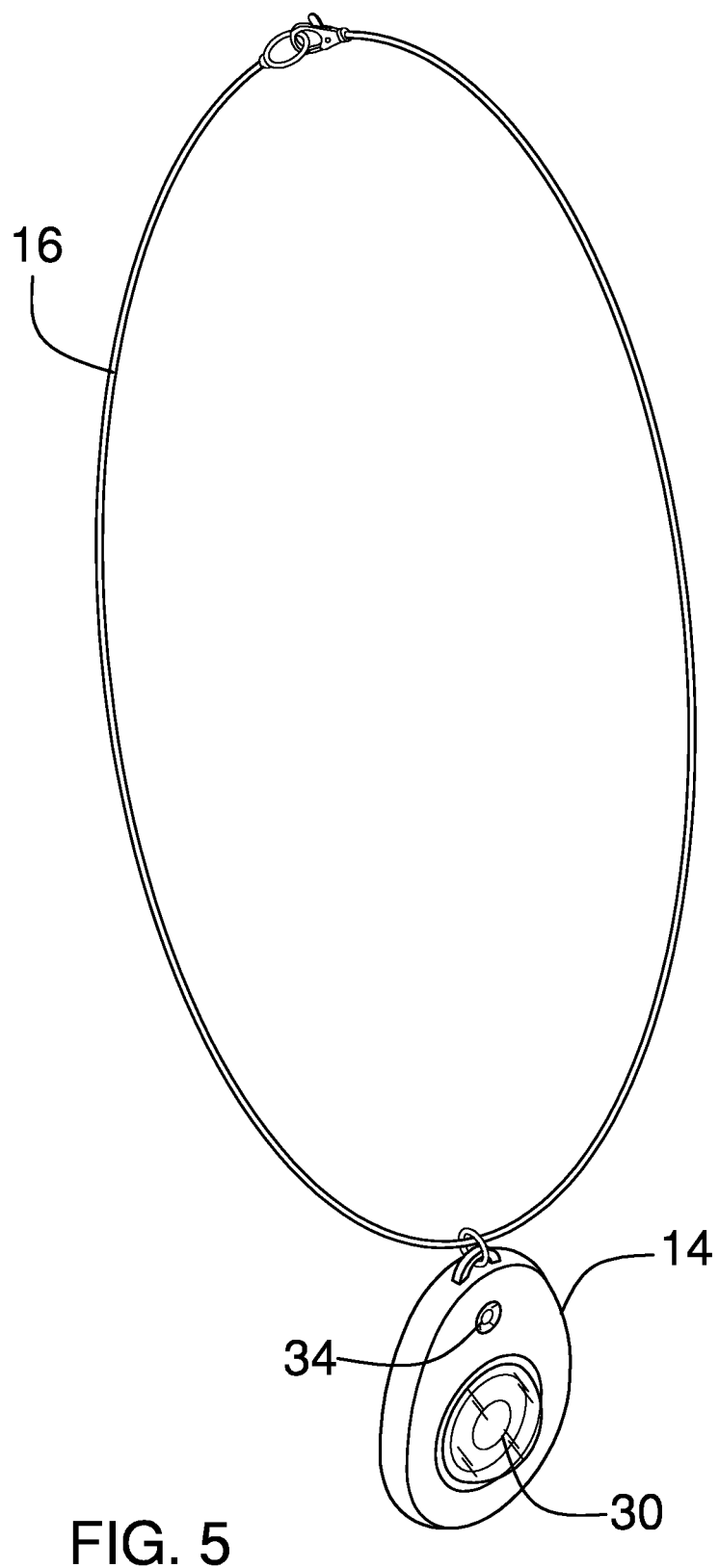
FIG. 5 is a perspective view of an embodiment of the disclosure showing a pendant on a necklace.
Figure 6:
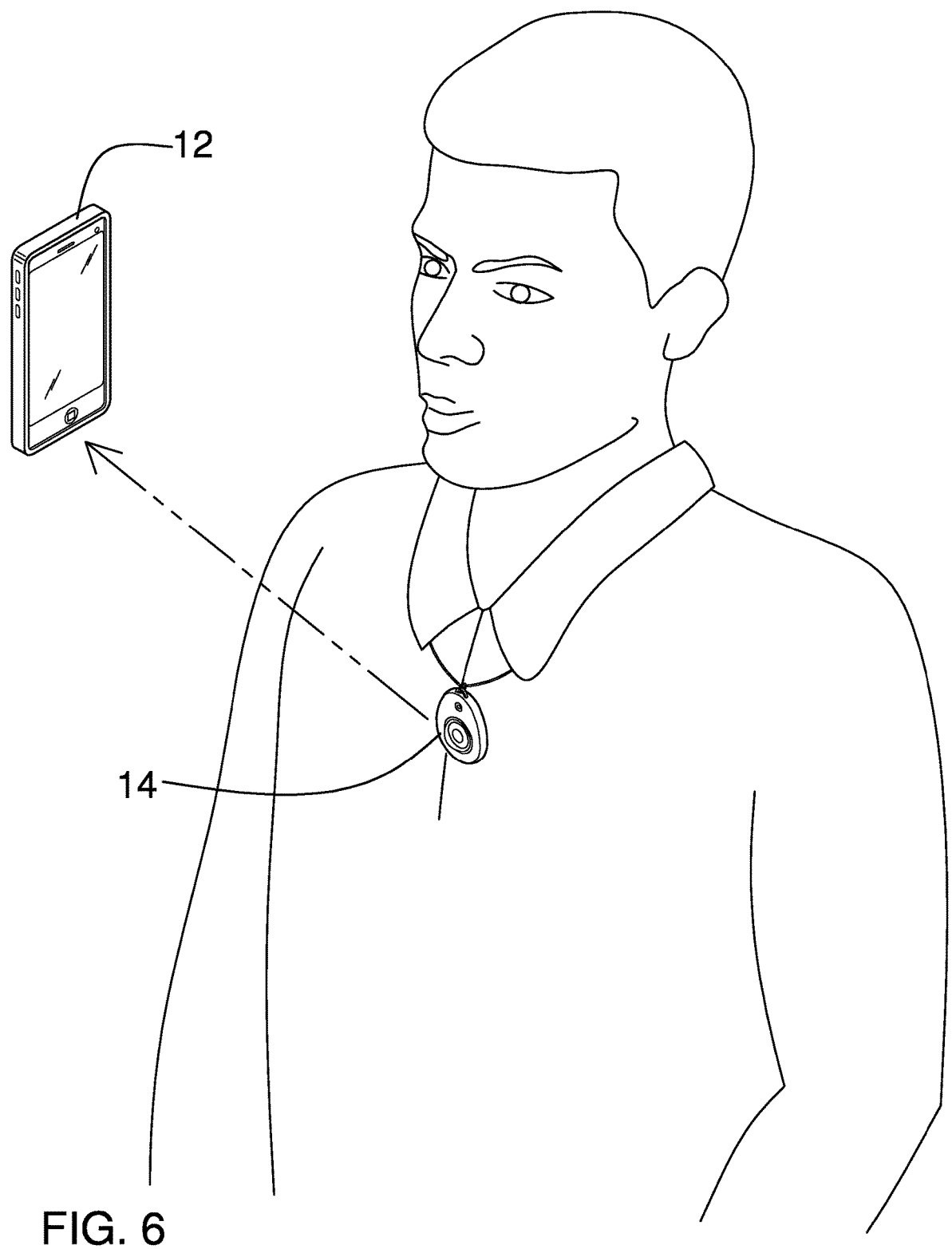
FIG. 6 is a perspective in-use view of an embodiment of the disclosure.

With reference now to the drawings, and in particular to FIGS. 1 through 6 thereof, a new surveillance device embodying the principles and concepts of an embodiment of the disclosure and generally designated by the reference numeral 10 will be described.

As best illustrated in FIGS. 1 through 6, the surveillance pendant assembly 10 generally comprises a personal electronic device 12, such as a smart phone or other similar device 12 that has wireless communication capabilities and digital data storage. A pendant 14 is provided that is attachable to a necklace 16 such that the pendant 14 can be worn on a user. The pendant 14 has a front wall 18, a back wall 20 and an outer wall 22 extending between the front wall 18 and the back wall 20. The outer wall 22 is continuously arcuate about a center point of the front wall 18 such that the pendant 14 has a rounded shape. Moreover, a curve of the outer wall 22 is elongated between a top side 24 and a bottom side 26 of the outer wall 22 such that the pendant 14 has an ovoid shape. An attachment 28 is coupled to the top side 24 of the outer wall 22 of the pendant 14 and the attachment 28 engages the necklace 16 for suspending the pendant 14 from the necklace 16. The necklace 16 may be a necklace of any conventional design, length or style.

A video camera 30 is integrated into the pendant 14 to capture video footage of the user's environment. The video camera 30 is positioned on the front wall 18 of the pendant 14 and the video camera 30 is positioned closer to the bottom side 26 than the top side 24 of the outer wall 22 of the pendant 14. The video camera 30 may comprise a digital video camera of any conventional design. A lens 32 is coupled to the front wall 18 of the pendant 14 and the lens 32 is aligned with the video camera 30. The lens 32 is comprised of a translucent material and the lens 32 may be a wide angle lens, a fish eye lens or any other lens designed to maximize the field of view available to the video camera 30. A microphone 34 is integrated into the pendant 14 to record audio of the user's environment. The microphone 34 is positioned on the front wall 18 of the pendant 14 and the microphone 34 is positioned between the video camera 30 and the top side 24 of the outer wall 22 of the pendant 14. Additionally, the microphone 34 may comprise an electronic microphone of any conventional design.

A control circuit 36 is provided and the control circuit 36 is integrated into the pendant 14. The video camera 30 is electrically coupled to the control circuit 36 and the microphone 34 is electrically coupled to the control circuit 36. A power supply 38 is removably positioned in the pendant 14, the power supply 38 is electrically coupled to the control circuit 36 and the power supply 38 comprises at least one battery. A battery cover 40 is removably integrated into the back wall 20 of the pendant 14 and the power supply 38 is positioned beneath the battery cover 40 for removing and replacing the power supply 38.

A transmitter 42 is integrated into the pendant 14 and the transmitter 42 is electrically coupled to the control circuit 36. The transmitter 42 broadcasts a video signal for communicating the video footage captured by the video camera 30. Additionally, the transmitter 42 broadcasts an audio signal for communicating the audio footage captured by the microphone 34. The transmitter 42 is in wireless communication with the personal electronic device 12 thereby facilitating the personal electronic device 12 to receive the video signal and the audio signal. In this way the personal electronic device 12 can record the video and audio for subsequent analysis. The transmitter 42 may comprise a radio frequency transmitter or the like and the transmitter 42 may employ Bluetooth communication protocols.

In use, the pendant 14 is worn on the necklace 16 when the user wishes to discretely capture video footage and audio footage for subsequent analysis. The personal electronic device 12 is synched with the transmitter 42 to facilitate the personal electronic device 12 to receive the video signal and the audio signal from the transmitter 42. In this way the video footage and the audio footage can be stored on the personal electronic device 12 for subsequent analysis. Additionally, the video footage and the audio footage can be downloaded from the personal electronic device 12 for archiving and analysis.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A surveillance pendant assembly for discretely recording video evidence and audio evidence, said assembly comprising:
    a personal electronic device;
    a pendant being attachable to a necklace wherein said pendant is configured to be worn on a user, said pendant has a front wall, a back wall and an outer wall extending between said from wall and said back wall, said outer wall being continuously arcuate about a center point of said front wall such that said pendant has a rounded shape a curve of said outer wall being elongated between a top side and a bottom side of said outer wall such that said pendant has an ovoid shape;
    an attachment being coupled to said top side of said outer wall of said pendant, said attachment engaging the necklace for suspending said pendant from the necklace;
    a video camera being integrated into said pendant wherein said video camera is configured to capture video footage of the user's environment, said video camera being in remote communication with said personal electronic device for storing video in said personal electronic device; and
    a microphone being integrated into said pendant wherein said microphone is configured to record audio of the user's environment, said microphone being in remote communication with said personal electronic device for storing audio in said personal electronic device;
    wherein said front wall and said outer wall of said pendant are smooth extending around said attachment, said video camera, and said microphone wherein said pendant is configured to appear devoid of operational controls on said front wall and said outer wall.

2. The assembly according to claim 1, wherein said video camera is positioned on said front wall of said pendant, said video camera being positioned closer to said bottom side than said top side of said outer wall of said pendant.

3. The assembly according to claim 1, wherein said microphone is positioned on said front wall of said pendant, said microphone being positioned between said video camera and said top side of said outer wall of said pendant.

4. The assembly according to claim 1, further comprising:
    a control circuit being integrated into said pendant, said video camera being electrically coupled to said control circuit, said microphone being electrically coupled to said control circuit; and
    a transmitter being integrated into said pendant, said transmitter being electrically coupled to said control circuit, said transmitter broadcasting a video signal for communicating the video footage captured by said video camera, said transmitter broadcasting an audio signal for communicating the audio footage captured by said microphone, said transmitter being in wireless communication with the personal electronic device thereby facilitating said personal electronic device to receive said video signal and said audio signal wherein said personal electronic device is configured to record the video and audio for subsequent analysis.

5. A surveillance pendant assembly for discretely recording video evidence and audio evidence, said assembly comprising:

a personal electronic device;

a pendant being attachable to a necklace wherein said pendant is configured to be worn on a user, said pendant having a front wall, a back wall and an outer wall extending between said front wall and said back wall, said outer wall being continuously arcuate about a center point of said front wall such that said pendant has a rounded shape, a curve of said outer wall being elongated between a top side and a bottom side of said outer wall such that said pendant has an ovoid shape;

an attachment being coupled to said top side of said outer wall of said pendant, said attachment engaging the necklace for suspending said pendant from the necklace;

a video camera being integrated into said pendant wherein said video camera is configured to capture video footage of the user's environment, said video camera being positioned on said front wall of said pendant, said video camera being positioned closer to said bottom side than said top side of said outer wall of said pendant;

a lens being coupled to said front wall of said pendant, said lens being aligned with said video camera;

a microphone being integrated into said pendant wherein said microphone is configured to record audio of the user's environment, said microphone being positioned on said front wall of said pendant, said microphone being positioned between said video camera and said top side of said outer wall of said pendant;

wherein said front wall and said outer wall of said pendant are smooth extending around said attachment, said video camera, and said microphone wherein said pendant is configured to appear devoid of operational controls on said front wall and said outer wall;

a control circuit being integrated into said pendant, said video camera being electrically coupled to said control circuit, said microphone being electrically coupled to said control circuit;

a transmitter being integrated into said pendant, said transmitter being electrically coupled to said control circuit, said transmitter broadcasting a video signal for communicating the video footage captured by said video camera, said transmitter broadcasting an audio signal for communicating the audio footage captured by said microphone, said transmitter being in wireless communication with said personal electronic device thereby facilitating said personal electronic device to receive said video signal and said audio signal wherein said personal electronic device is configured to record the video and audio for subsequent analysis; and a power supply being removably positioned in said pendant, said power supply being electrically coupled to said control circuit, said power supply comprising at least one battery.

\* \* \* \* \*